United States Patent
Kaup

(10) Patent No.: US 6,408,025 B1
(45) Date of Patent: Jun. 18, 2002

(54) METHOD AND CONFIGURATION FOR CODING AND DECODING DIGITIZED PICTURES

(75) Inventor: Andre Kaup, Höhenkirchen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/365,526

(22) Filed: Aug. 2, 1999

Related U.S. Application Data

(63) Continuation of application No. PCT/DE98/00156, filed on Jan. 19, 1998.

(30) Foreign Application Priority Data

Jan. 31, 1997 (DE) .......................... 197 03 670

(51) Int. Cl.[7] .............................................. H04B 1/66
(52) U.S. Cl. .............................................. 375/240.02
(58) Field of Search ................ 375/240.02, 240.12, 375/240.13, 240.01, 240; 348/404.1, 415.1, 416.1; 382/236, 268, 232, 250; H04B 2/66

(56) References Cited

U.S. PATENT DOCUMENTS

| | | | |
|---|---|---|---|
| 5,714,950 A | * | 2/1998 | Jeong et al. ............... 341/67 |
| 5,959,672 A | * | 9/1999 | Sasaki ..................... 348/390 |
| 5,974,197 A | * | 10/1999 | Lee et al. .................. 382/268 |
| 5,990,956 A | * | 11/1999 | Lee ......................... 348/404.1 |
| 6,108,449 A | * | 8/2000 | Sekiguchi et al. .......... 382/236 |

FOREIGN PATENT DOCUMENTS

EP 0 530 022 A2 3/1993

OTHER PUBLICATIONS

K. R. Rao et al.: "Discrete Cosine Transform Algorithms, Advantages Applications", Academic Press, Inc., Jan. 1, 1990, pp. 163–207.
Siemens Profiset 70 isdn, Siemens AG, 1999.
Siemens: EWSD ISDN The Best Connection to New Markets, Siemens Publication, 1998.
Thomas Sikora et al.: "Shape–Adaptive DCT for Generic Coding of Video", IEEE Transactions on circuits and systems for video technology, vol. 5, No. 1, Feb. 1, 1995, pp. 59–62.
"MPEG–4 Video Verification Model Version 2.0", ISO/IEC JTC1/SC29/WG11, N 1260, Mar. 1996, Firenze, pp. 55–59.

* cited by examiner

*Primary Examiner*—Chris Kelley
*Assistant Examiner*—Tung Vo
(74) *Attorney, Agent, or Firm*—Laurence A. Greenberg; Werner H. Stemer; Ralph E. Locher

(57) ABSTRACT

Digitized pictures are subjected to shape-adaptive transformation coding and a inverse, shaped transformation coding. The signal energy of the coding information of the pixels to be transformed is, in the local area, approximately identical to the signal energy of the coding information of the transformed pixels in the frequency domain.

11 Claims, 3 Drawing Sheets

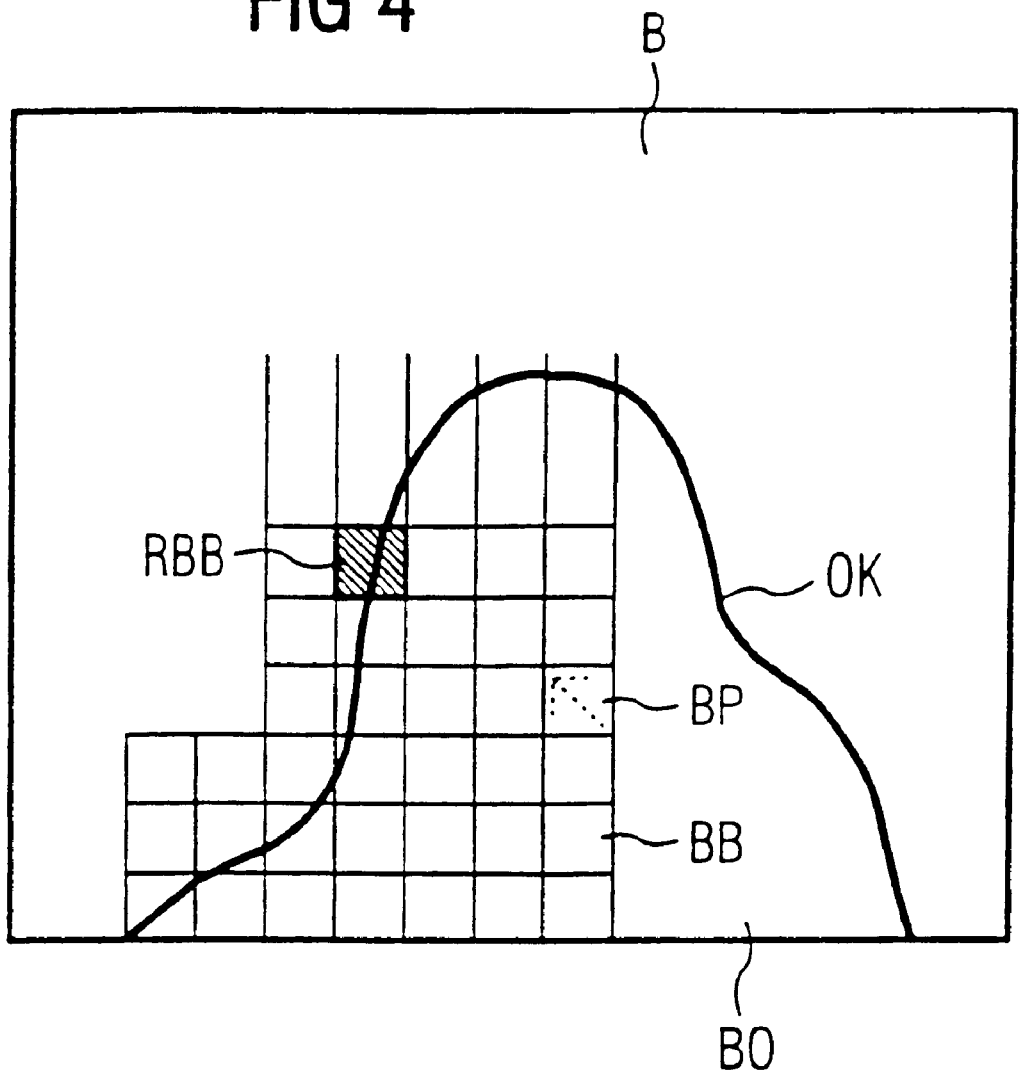

METHOD AND CONFIGURATION FOR CODING AND DECODING DIGITIZED PICTURES

CROSS-REFERENCE TO RELATED APPLICATION

This is a continuation of copending International Application PCT/DE98/00156, filed Jan. 19, 1998, which designated the United States.

BACKGROUND OF THE INVENTION

Field of the Invention

The invention lies in the electronics field and, more specifically, in the field of electronic video signal processing.

The coding of video signals in accordance with the picture coding standards H.261, H.263, MPEG1 and MPEG2 is based on a block-oriented discrete cosine transform (DCT). These methods generally use the principle of block-based picture coding.

A further approach to picture coding is the so-called principle of object-based picture coding. In such object-based picture coding, the original pictures are segmented in accordance with the objects that appear in the scene, and those objects are coded separately.

Reference will be had, in the following, to FIG. 2, which provides a general illustration of a configuration for picture coding and picture decoding.

A camera K records object pictures. The camera K may be, for example, any desired analog camera K which records pictures of a scene and either digitizes the pictures in the camera K or else transmits them in analog form to a first computer R1, in which then either the digitized pictures B are processed or the analog pictures are first converted into digitized pictures B and the digitized pictures B are processed.

The camera K may also be a digital camera K with which digitized pictures B are recorded directly and are fed to the first computer R1 for further processing.

The first computer R1 may also be configured as a dedicated configuration which is used to carry out the method steps described below, for example as a dedicated computer card installed in a computer.

The first computer R1 should be understood generally to mean any unit which can perform video signal processing in accordance with the method described below, for example including a mobile terminal (mobile telephone).

The first computer R1 has a processor unit P which is used to carry out the method steps of picture coding or of picture decoding that are described below. The processor unit P is coupled for example via a bus BU to a memory SP in which the video data are stored.

In general, the methods described below can be realized either using software or using hardware or else partly using software and partly using hardware.

Once picture coding has been effected in the first computer R1 and the compressed video data have been transmitted via a transmission medium TM to a second computer R2, picture decoding is carried out in the second computer R2.

The second computer R2 may have the same structure as the first computer R1, that is to say the memory SP which is coupled via the bus BU to the processor unit P.

FIG. 3 gives a more detailed illustration of a possible configuration in the form of a basic circuit diagram for picture coding and/or for picture decoding which can be used in the context of block-based picture coding and, in some instances, as explained below, in the context of object-based picture coding.

In block-based picture coding methods, a digitized picture B is divided into, typically square, blocks having a size of 8×8 pixels BP or 16×16 pixels BP. Those subdivided blocks are fed to the configuration for picture coding.

Usually, coding information is uniquely assigned to a pixel, for example brightness information (luminance values) or color information (chrominance values).

In the block-based picture coding methods, a distinction is made between various picture coding modes.

In the so-called intra-picture coding mode, in each case the entire picture with the entire coding information assigned to the pixels of the picture is coded and transmitted (I picture).

In the so-called inter-picture coding mode, in each case only the difference picture information between two chronologically succeeding pictures is coded and transmitted (P picture, B picture).

In order to change over between the intra-picture coding mode and the inter-picture coding mode, two switch units SE are provided. In order to carry out the inter-picture coding mode, a subtraction unit S is provided in which the difference in the picture information of two succeeding pictures B is formed. The entire picture coding is controlled by means of a picture coding control unit ST. The picture blocks BB or difference picture blocks BB to be coded are in each case fed to a transform coding unit DCT, in which transform coding, for example the discrete cosine transform (DCT), is applied to the coding information assigned to the pixels.

In general, however, it is possible to carry out any desired transform coding, for example a discrete sine transform or else a discrete Fourier transform.

The spectral coefficients formed by the transform coding are quantized in a quantization unit Q and fed to a non-illustrated picture coding multiplexer for example for channel coding and/or for entropy coding. In an internal reconstruction loop, the quantized spectral coefficients are subjected to inverse quantization in an inverse quantization unit IQ and to inverse transform coding in an inverse transform coding unit IDCT.

Furthermore, in the case of inter-picture coding, picture information of the respective chronologically preceding picture is added in an adder unit AE. The pictures reconstructed in this way are stored in a frame memory SP. A unit for motion compensation MC is illustrated symbolically in the frame memory SP in order to simplify the illustration.

Furthermore, a loop filter LF is provided which is connected to the memory SP and also to the subtraction unit S.

In addition to the video data to be transmitted, a mode flag p is fed to the picture coding multiplexer. The flag designates the type of coding, i.e., it specifies in each case whether intra or inter-picture coding has been performed.

Furthermore, quantization indices q for the spectral coefficients are fed to the picture coding multiplexer.

A motion vector v is also assigned in each case to a picture block and/or a macroblock having four picture blocks, for example. The motion vector v is also fed to the picture coding multiplexer.

Furthermore, an information item f for the activation or deactivation of the loop filter LF is provided.

After the transmission of the picture information via the transmission medium TM, the transmitted data can be decoded in the second computer R2. For this purpose, a picture decoding unit is provided in the second computer R2 and, for example, has the structure of the reconstruction loop of the configuration illustrated in FIG. 2.

In the case of object-based picture coding methods, each picture object is firstly split into blocks having a fixed size, for example likewise 8×8 pixels. After this splitting, some of the resulting picture blocks are located completely within a picture object BO. This situation is illustrated in FIG. 4. The picture B contains at least one picture object BO, which is bounded by an object edge OK of the picture object BO. Furthermore, picture blocks BB having 8×8 pixels BP are illustrated. Picture blocks BB which contain at least part of the object edge OK are designated as edge picture blocks RBB below.

Picture blocks BB which are located completely within the picture object BO after the splitting operation can be coded in a manner following the above-mentioned block-based picture coding methods using a customary block-based discrete cosine transform. However, the edge picture blocks RBB are partly filled with picture information and have to be coded using a special method.

Two fundamental approaches exist to date for coding the edge picture blocks RBB.

Reference is first had to ISO/IEC JTC1/SC29/WG11, MPEG-4 Video Verification Model Version 5.0 Doc. N1469, November 1996, pp. 55–59. That document discloses supplementing the picture information of the picture object BO within the edge picture block RBB by means of a suitable extrapolation method of the coding information to the area of the complete edge picture block RBB. This procedure is referred to as padding. The supplemented area is then coded using a customary two-dimensional discrete cosine transform.

As an alternative to that process, the above-noted document as well as Sikora and Makai, "Shape Adaptive DCT for Generic Coding of Video," IEEE Transactions on Circuits and Systems for Video Technology, Vol. 5, pp. 59–62, Febuary 1995, disclose transforming the given picture object BO separately according to rows and columns. This procedure is referred to as shape-adaptive transform coding, and as shape-adaptive DCT in the specific case of the use of a DCT. The DCT coefficients assigned to the picture object BO are determined in such a way that those pixels BP of an edge picture block RBB which do not belong to the picture object BO are masked out. A transform is then firstly applied line by line to the remaining pixels BP, the length of which transform corresponds to the number of pixels remaining in this row. The resulting coefficients are horizontally aligned and then subjected to a further one-dimensional DCT in the vertical direction with a corresponding length. In this case, the same method is employed both for the intra-picture coding and for the inter-picture coding.

The known method of shape adaptive transform coding, which has been described above, primarily has the disadvantage that only a relatively poor compression factor of the video data to be compressed is achieved in the case of prediction error pictures.

The known specification for coding prediction error pictures in shape-adaptive transform coding is based on a transform matrix DCT–N having the following structure:

$$DCT\text{–}N(p, k) = \gamma \cdot \cos[p \cdot (k+\tfrac{1}{2}) \cdot \tfrac{\pi}{N}]k, \quad p=0 \rightarrow N-1$$

In this case, $$\lambda = \frac{1}{\sqrt{2}}$$

for p=0, and γ=1 for all other cases.

N designates a magnitude of the picture vector which is to be transformed and in which the transformed pixels are contained.

DCT–N designates a transform matrix having the size N×N.

p, k designate indices, where p, k ∈[0, N–1].

According to the known procedure, the shape-adaptive PCT of a picture segment is determined in that firstly each column of the segment is vertically transformed in accordance with the specification $$c_j = 2 \cdot \tfrac{2}{N} \cdot DCT\text{–}N \cdot x_j \tag{2}$$

and afterwards the same specification (2) is applied to the resulting data in the horizontal direction. However, the specification in accordance with formula (2) is not optimal for coding prediction error pictures.

SUMMARY OF THE INVENTION

It is accordingly an object of the invention to provide a method for picture coding and for picture decoding and configurations for picture coding and for picture decoding, which overcome the above-mentioned disadvantages of the heretofore-known devices and methods of this general type and which allow shape-adapted transform coding to be achieved with an improved compression factor for the video data.

With the foregoing and other objects in view there is provided, in accordance with the invention, a Method of coding a digitized picture having picture objects with an arbitrary number of pixels, which comprises:

coding pixels with shape-adaptive transform coding; and carrying out the shape-adaptive transform coding such that a signal energy of pixels to be transformed in a space domain is substantially identical to a signal energy of transformed pixels in a frequency domain.

The method for the coding of a digitized picture B, the pixels BP of a picture object BO are coded with an altered shape-adaptive transform coding.

The "new" shape-adaptive transform coding is carried out in such a way that the signal energy of the coding information of the pixels to be transformed in the space domain is approximately equal to the signal energy of the coding information of the transformed pixels in the frequency domain. In other words, this means that the shape-adaptive transform coding is orthonormalized.

This procedure has the particular advantage that the quantization error during the subsequent quantization of the spectral coefficients resulting from the transformation is distributed uniformly over all of the pixels BP, and the quantization error has the same average value as in the case of a normal 8×8 picture block.

This method is primarily suitable for the coding of edge picture blocks of a picture segment.

Overall, the method results in a distinctly improved coding efficiency, i.e. with the same data rate, the picture quality that can be achieved rises. As is described below, in contrast to the known method, it is possible to achieve a considerably improved signal/noise power ratio of approximately one dB without any additional computing outlay.

In accordance with an added mode of the invention, transform coefficients of the transformed pixels are formed in accordance with:

$$c_j = \sqrt{2/N} \cdot DCT\text{-}N(p, k) \cdot x_j \qquad (3)$$

where $c_j$ are the transform coefficients and $x_j$ are the signal; energies of the pixels being transformed N represents a magnitude of a picture vector to be transformed and in which the transformed pixels are contained;

DCT-N designates a transform matrix having the size N×N; and p, k designate indices, whereby p, k $\in [0, N-1]$.

In accordance with an additional feature of the invention, picture coding is carried out either in intra-picture coding mode or inter-picture coding mode;

shape-adaptive transform coding is done only in inter-picture coding mode; and a second shape-adaptive transform coding is carried out different from the shape-adaptive transform coding in the intra-picture coding mode.

In accordance with another feature of the invention, the second shape-adaptive transform coding is a shape-adaptive discrete cosine transform.

With the above and other objects in view there is also provided, in accordance with the invention, a method of decoding a digitized picture having picture objects with an arbitrary number of pixels, which comprises:

decoding pixels in a digitized picture with inverse shape-adaptive transform coding to form transformed pixels; and carrying out the shape-adaptive transform decoding such that a signal energy of the pixels to be transformed in a space domain is substantially identical to a signal energy of the transformed pixels in a frequency domain.

Here, an inverse shape-adaptive transform coding is carried out for the purpose of decoding. Again, the signal energy of the coding information of the pixels to be transformed in the space domain is approximately equal to the signal energy of the coding information of the transformed pixels in the frequency domain.

This method likewise has the advantages for picture coding mentioned above.

In accordance with a further feature of the invention, the shape-adaptive transform coding is a variant of a shape-adaptive discrete cosine transform.

In accordance with again an added feature of the invention, transformed pixels are formed from transform coefficients in accordance with the following specification:

$$x_j = \sqrt{2/N} \cdot (DCT\text{-}N(p, k))^{-1} \cdot c_j \qquad (4)$$

where $x_j$ are the resulting signal energies of the pixels and $c_j$ are the transform coefficients;

N designates a magnitude of the picture vector to be transformed and wherein the transformed pixels are contained;

DCT–N designates a transform matrix having the size N–N;

p, k designate indices, whereby p, k $\in [0, N-1]$; and $(\ )^{-1}$ designates inversion of a matrix.

In accordance with again another feature of the invention, picture decoding is effected in either intra-picture decoding mode or inter-picture decoding mode;

shape-adaptive transform coding is effected only in the inter-picture decoding mode; and a second shape-adaptive transform coding is carried out that is different from the shape-adaptive transform coding in the intra-picture decoding mode.

In accordance with again a further feature of the invention, the second shape-adaptive transform coding is a shape-adaptive discrete cosine transform.

In accordance with a concomitant feature of the invention, the picture contains picture blocks including edge picture blocks and the method further comprises shape-adaptive transform coding only the edge picture blocks.

With the above and other objects in view there is provided, in accordance with the invention, a configuration for performing the above method, i.e., a configuration for coding and/or decoding a digitized picture having picture objects with an arbitrary number of pixels, comprising:

a transform coding unit for shape-adaptive transform coding of pixels in a digitized picture, the transform coding unit carrying out the shape-adaptive transform coding such that a signal energy of pixels to be transformed in a space domain is substantially identical to a signal energy of transformed pixels in a frequency domain; and/or a transform decoding unit for inverse shape-adaptive transform coding of the pixels, the transform decoding unit carrying out the shape-adaptive transform decoding such that a signal energy of the pixels to be transformed in a space domain is substantially identical to a signal energy of the transformed pixels in a frequency domain.

The transform coding unit and/or the transform decoding unit is configured in such a way that the signal energy of the coding information of the pixels to be transformed in the space domain is approximately equal to the signal energy of the coding information of the transformed pixels in the frequency domain.

The above-described advantages of the novel transform coding also apply to the configuration.

As can be discerned in the specification (3), the considerable improvement is achieved merely by a different scaling of the transform specification relative to the prior art procedure.

Furthermore, in a development that is advantageous to carry out the "new" shape-adaptive transform coding only in the inter-picture coding mode. The known shape-adaptive transform coding is carried out in the intra-picture coding mode in this development.

The above-described developments for the method for picture coding are likewise provided as developments for the picture decoding, in the specification for inverse transform coding with the correspondingly inverse specification.

The developments of the methods are likewise advantageous for refinements of the transform coding unit of the configuration for picture coding.

Likewise, the developments of the transform coding that have been represented in connection with the methods are also provided for the configuration for picture decoding, where the transform coding unit is in each case configured in such a way that the corresponding developments are realized.

Both the methods and the configurations can be used particularly advantageously in the shape-adaptive transform coding for edge picture blocks in the context of object-based picture coding.

Other features which are considered as characteristic for the invention are set forth in the appended claims.

Although the invention is illustrated and described herein as embodied in a method and configuration for the coding and decoding of a digitized picture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a partially diagrammatic representation of a picture with a picture object and picture blocks and edge picture blocks.

DESCRIPTION OF THE PREFERRED EMBODIMENTS

In the context of object-based picture coding, the digitized picture B is segmented in accordance with the picture objects BO occurring in the scene, and the picture objects BO are coded separately.

For this purpose, each picture object BO is usually firstly split into picture blocks BB having a fixed size, for example 8×8 pixels BP. After the splitting operation, some of the resulting picture blocks BB are located completely within the picture object BO. These blocks BB can be coded in a manner following the cited methods explained above using a conventional block-based transform coding.

As described above, the edge picture blocks RBB are, however, only partly filled with picture information and have to be coded using a special method.

Figure 1:
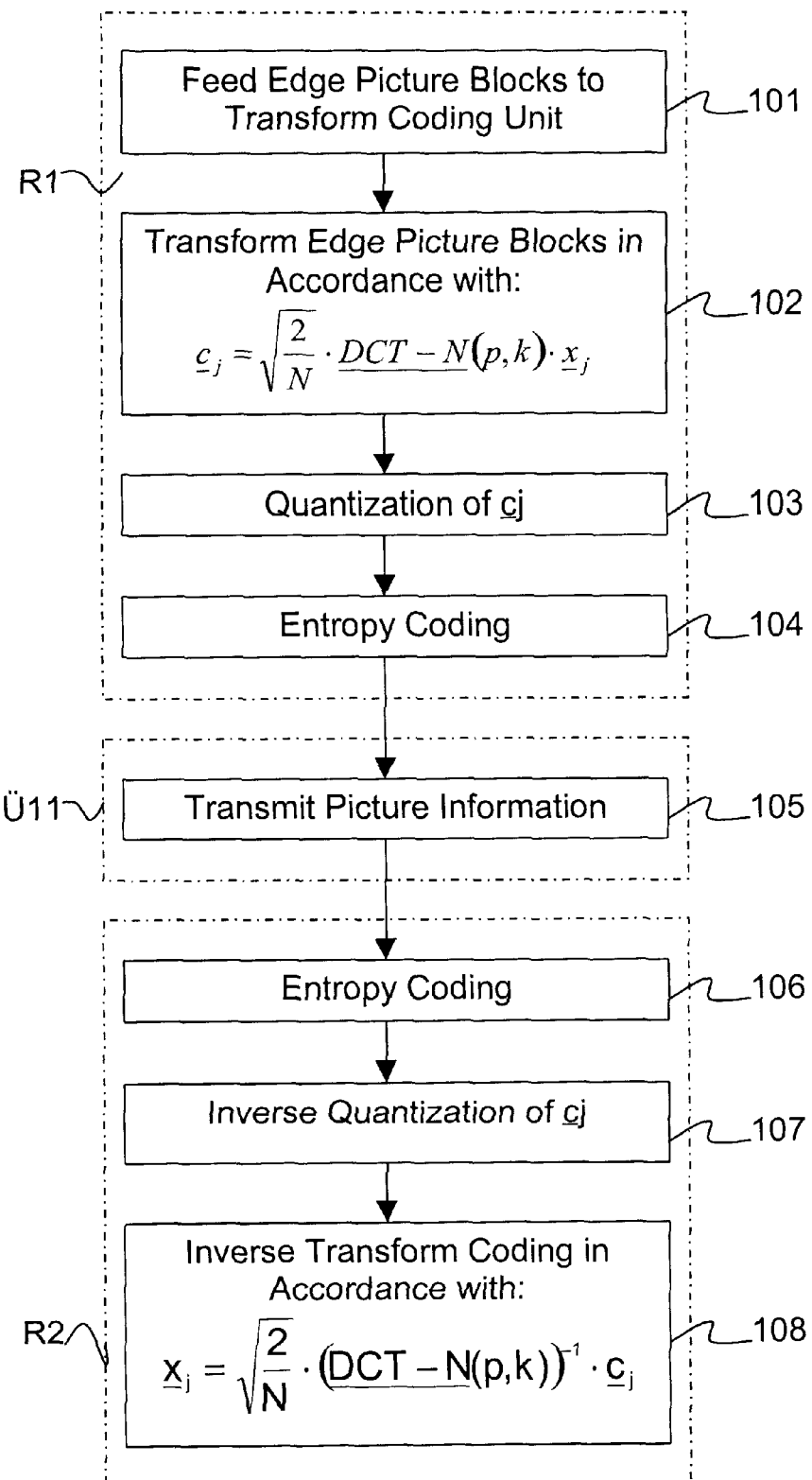
FIG. 1 is a flow diagram symbolically illustrating the individual method steps.
Figure 2:
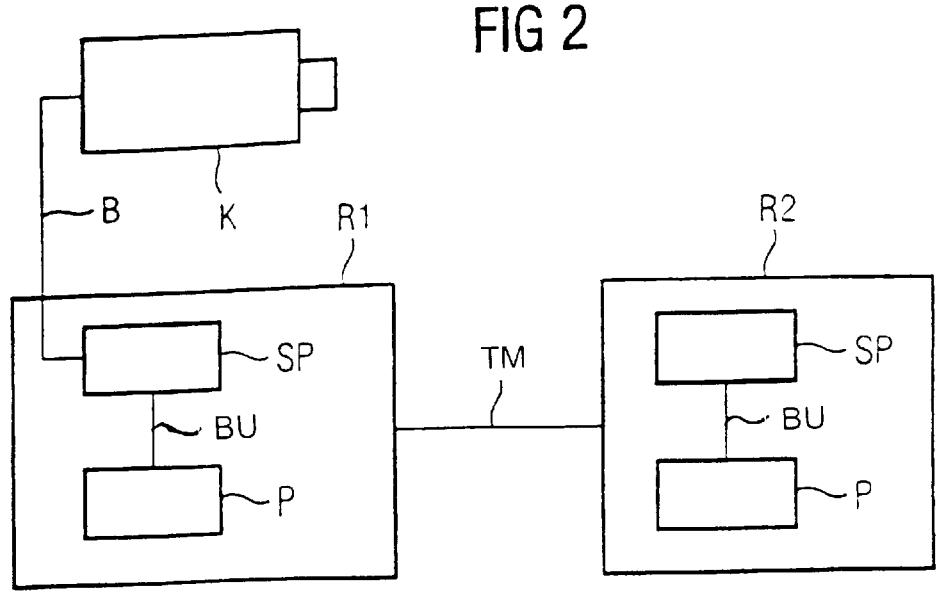
FIG. 2 is a diagrammatic view of a configuration for picture coding having a camera, two computers and a transmission medium.
Figure 3:
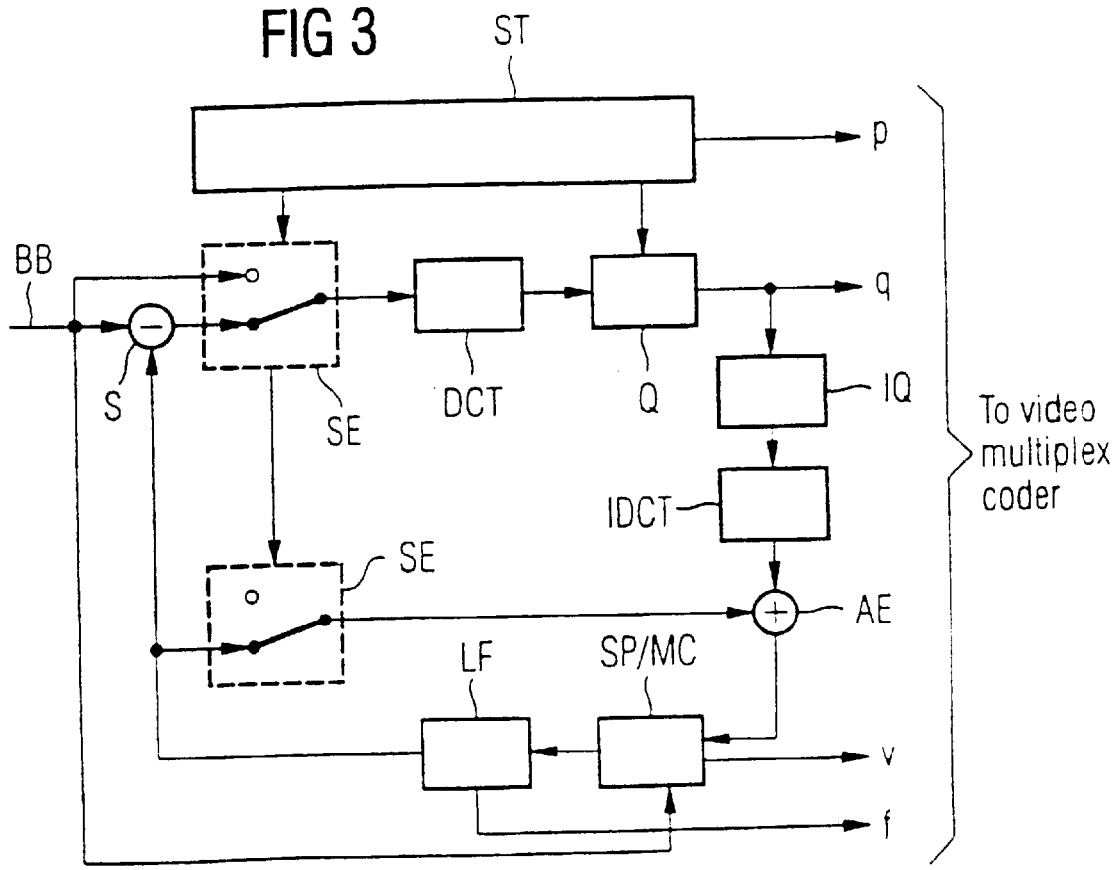
FIG. 3 is a schematic diagram of a configuration for block-based picture coding.

Referring now to the figures of the drawing in detail and first, particularly, to FIG. 1 thereof, the edge picture blocks RBB are preferably fed, in the first computer R1, to the transform coding unit DCT in a first step 101. The first computer R1 is configured in such a way that the modules represented symbolically in FIG. 3 can be implemented.

In a second step 102, for each edge picture block RBB transform coefficients $c_j$ of the pixels $x_j$ to be transformed are formed for the coding information of the pixels BP of the respective edge picture block RBB, in accordance with the following specification:

$$c_j = \sqrt{2/N} \cdot DCT\text{-}N(p, k) \cdot x_j \qquad (3)$$

where
N designates a magnitude of the picture vector which is to be transformed and in which the transformed pixels are contained,
DCT-N designates a transform matrix having the size N×N,
p, k are indices, whereby p, k ∈[0, N−1].

Clearly, the specification for transform coding (3) signifies that the signal energy of the coding information of the pixels to be transformed in the space domain is identical to the signal energy of the coding information of the transformed pixels in the frequency domain.

The shape-adaptive discrete cosine transform is preferably used as the shape-adaptive transform coding.

The specification (3) is preferably employed for transform coding when the picture coding is carried out in the inter-picture coding mode.

When the picture coding is carried out in the intra-picture coding mode, the transform coefficients $c_j$ of the transformed pixels $x_j$ are preferably formed in accordance with the following specification:

$$c_j = 2 \cdot 2/N \cdot DCT\text{-}N \cdot x_j \qquad (2)$$

After the transmission of the coded picture information (step 105), i.e. after quantization (step 103), possibly entropy coding (step 104) of the transmitted video data for example according to the method described in the above-mentioned document ISO/IEC JTC1/SC29/WG11, via the transmission medium TM, picture decoding is carried out in the second computer R2.

In the case of picture decoding, entropy decoding is carried out in a first step 106 and an inverse quantization of the quantized spectral coefficients is carried out in a second step 107. The spectral coefficients $c_j$ are furthermore fed to the inverse shape-adaptive transform coding (IDCT). In a manner corresponding to the method for picture coding, for picture decoding a shape-adaptive transform coding is once again carried out in such a way that the signal energy of the coding information of the transformed pixels in the frequency domain is approximately identical to the signal energy of the coding information of the pixels in the space domain.

For the purpose of inverse shape-adaptive transform coding, the pixels $x_j$ are formed from the spectral transform coefficients $c_j$ in accordance with the following specification (step 108):

$$x_j = \sqrt{2/N} \cdot (DCT\text{-}N(p, k))^{-1} \cdot c_j \qquad (4)$$

where
N designates a magnitude of the picture vector which is to be transformed and in which the transformed pixels are contained;
DCT-N designates a transform matrix having the size N×N;
p, k designate indices, whereby p, k ∈[0, N−1]; and
( )⁻ designates inversion of a matrix.

The inverse shape-adaptive transform coding in accordance with specification (4) is preferably carried out in the context of picture decoding in the inter-picture decoding mode.

In the intra-picture decoding mode, the shape-adaptive inverse transform coding is preferably carried out in accordance with the following specification:

$$x_j = \tfrac{1}{2} \cdot (DCT\text{-}N(p, k))^{-1} \qquad (5).$$

In the configuration for picture coding, provision is made of a transform coding unit DCT for the shape-adaptive transform coding of the pixels BP. The transform coding unit DCT is configured in such a way that a signal energy of the coding information of the pixels to be transformed in the space domain is approximately identical to the signal energy of the coding information of the transformed pixels in the frequency domain.

The transform coding unit is preferably configured in such a way that the method steps illustrated in the context of the method for picture coding are realized in the transform coding unit DCT. Of course, the method can also be realized, in the configuration, using software which is processed by the processor P.

The same applies to the configuration for picture decoding, which has an inverse transform coding unit IDCT. In a corresponding manner, the inverse transform coding unit IDCT is configured in such a way that the method steps for picture decoding, in particular for inverse shape-adaptive transform coding, are realized.

Both the method and the configurations can preferably be applied to edge picture blocks RBB of picture objects BO of a digitized picture B.

Clearly, the method signifies altered scaling of the transform specification, where the signal energy of the coding information of the pixels in the space domain is equal to the signal energy of the coding information of the pixels in the frequency domain.

The way in which the transformed pixels, i.e. the spectral coefficients, are used further in the context of picture coding, i.e. the type of quantization, of entropy coding and/or of channel coding, is not essential to the invention.

I claim:

1. Method of coding a digitized picture having picture objects with an arbitrary number of pixels, which comprises:
    coding pixels with shape-adaptive transform coding;
    forming transform coefficients of the transformed pixels in accordance with:

$$c_j = \sqrt{2/N} \cdot DCT\text{-}N(p, k) \cdot x_j,$$

where $c_j$ are the transform coefficients and $x_j$ are the transformed pixels, N represents a magnitude of a picture vector to be transformed and in which the transformed pixels are contained, DCT–N designates a transform matrix having the size N×N, and p, k designate indices, whereby p, k $\in [0, N-1]$; and
    carrying out the shape-adaptive transform coding such that a signal energy of pixels to be transformed in a space domain is substantially identical to a signal energy of transformed pixels in a frequency domain.

2. The method according to claim 1, which comprises picture coding in one of intra-picture coding mode and inter-picture coding mode;
    shape-adaptive transform coding in only inter-picture coding mode; and
    carrying out a second shape-adaptive transform coding different from the shape-adaptive transform coding in the intra-picture coding mode.

3. The method according to claim 2 wherein the second shape-adaptive transform coding is a shape-adaptive discrete cosine transform.

4. A method of decoding a digitized picture having picture objects with an arbitrary number of pixels, which comprises:
    decoding pixels in a digitized picture with inverse shape-adaptive transform coding to form transformed pixels;
    forming transformed pixels from transform coefficients in accordance with the following specification:

$$x_j = \sqrt{2/N} \cdot DCT\text{-}N(p, k))^{-1} \cdot c_j$$

$c_j$ where are the transformed pixels and $c_j$ are the transform coefficients, N designates a magnitude of the picture vector to be transformed and wherein the transformed pixels are contained, DCT–N designates a transform matrix having the size N×N, p, k designate indices, whereby p, k $\in [0, N-1]$, and $(\ )^{-1}$ designates inversion of a matrix; and
    carrying out the shape-adaptive transform decoding such that a signal energy of the pixels to be transformed in a space domain is substantially identical to a signal energy of the transformed pixels in a frequency domain.

5. The method according to claim 4, wherein the shape-adaptive transform coding is a variant of a shape-adaptive discrete cosine transform.

6. The method according to claim 4, wherein a picture contains picture blocks including edge picture blocks and the method further comprises shape-adaptive transform coding only the edge picture blocks.

7. The method according to claim 4, which comprises picture decoding in one of an intra-picture decoding mode and an inter-picture decoding mode;
    shape-adaptive transform coding only in the inter-picture decoding mode; and
    carrying out a second shape-adaptive transform coding different from the shape-adaptive transform coding in the intra-picture decoding mode.

8. The method according to claim 7, wherein the second shape-adaptive transform coding is a shape-adaptive discrete cosine transform.

9. A configuration for coding and decoding a digitized picture having picture objects with an arbitrary number of pixels, comprising:
    a transform coding unit for shape-adaptive transform coding of pixels in a digitized picture by forming transform coefficients of the transformed pixels in accordance with:

$$c_j = \sqrt{2/N} \cdot DCT\text{-}N(p, k) \cdot x_j,$$

where $c_j$ are the transform coefficients and $x_j$ are the transformed pixels, N represents a magnitude of a picture vector to be transformed and in which the transformed pixels are contained, DCT-N designates a transform matrix having the size N×N, and p, k designate indices, whereby p, k $\in [0, N-1]$;
    said transform coding unit carrying out the shape-adaptive transform coding such that a signal energy of pixels to be transformed in a space domain is substantially identical to a signal energy of transformed pixels in a frequency domain; and
    a transform decoding unit for inverse shape-adaptive transform coding of the pixels by forming transformed pixels from transform coefficients in accordance with the following specification:

$$x_j = \sqrt{2/N} \cdot DCT\text{-}N(p, k))^{-1} \cdot c_j$$

where $x_j$ are the transformed pixels and $c_j$ are the transform coefficients, N designates a magnitude of the picture vector to be transformed and wherein the transformed pixels are contained, DCT–N designates a transform matrix having the size N×N, p, k designate indices, whereby p, k $\in [0, N-1]$, and $(\ )^{-1}$ designates inversion of a matrix,
    the transform decoding unit carrying out the shape-adaptive transform decoding such that a signal energy of the pixels to be transformed in a space domain is substantially identical to a signal energy of the transformed pixels in a frequency domain.

10. A configuration for coding a digitized picture having picture objects with an arbitrary number of pixels, comprising:
    a transform coding unit for shape-adaptive transform coding of pixels in a digitized picture by forming transform coefficients of the transformed pixels in accordance with:

$$c_j = \sqrt{2/N} \cdot DCT\text{-}N(p, k) \cdot x_j,$$

where $c_j$ are the transform coefficients and $x_j$ are the transformed pixels, N represents a magnitude of a picture vector to be transformed and in which the transformed pixels are contained, DCT-N designates a transform matrix having the size N×N, and p, k designate indices, whereby $p, k \in [0, N-1]$, said transform coding unit carrying out the shape-adaptive transform coding such that a signal energy of pixels to be transformed in a space domain is substantially identical to a signal energy of transformed pixels in a frequency domain.

11. A configuration for decoding a digitized picture having picture objects with an arbitrary number of pixels, comprising:

a transform decoding unit for inverse shape-adaptive transform coding of the pixels by forming transformed pixels from transform coefficients in accordance with the following specification:

$$x_j = \sqrt{2/N} \cdot DCT\text{-}N(p, k))^{-1} \cdot c_j$$

where $x_j$ are the transformed pixels and $c_j$ are the transform coefficients, N designates a magnitude of the picture vector to be transformed and wherein the transformed pixels are contained, DCT-N designates a transform matrix having the size N×N, p, k designate indices, whereby $p, k \in [0, N-1]$, and $(\ )^{-1}$ designates inversion of a matrix, the transform decoding unit carrying out the shape-adaptive transform decoding such that a signal energy of the pixels to be transformed in a space domain is substantially identical to a signal energy of the transformed pixels in a frequency domain.

\* \* \* \* \*